United States Patent
Pease

(10) Patent No.: US 6,363,814 B1
(45) Date of Patent: Apr. 2, 2002

(54) ATTACHMENT FOR MOTORCYCLE KICK STARTER

(76) Inventor: Wayne Pease, 4710 Dusty La., Placerville, CA (US) 95667

(*) Notice: Subject to any disclaimer, the term of this patent is extended or adjusted under 35 U.S.C. 154(b) by 0 days.

(21) Appl. No.: 09/528,563

(22) Filed: Mar. 20, 2000

(51) Int. Cl.⁷ .................................................. G05G 1/18
(52) U.S. Cl. ......................................... 74/564; 280/291
(58) Field of Search ........................... 74/564; 280/291, 280/288.4; 180/219; 296/75; D12/114

(56) References Cited

U.S. PATENT DOCUMENTS

| | | | |
|---|---|---|---|
| 1,207,490 A | | 12/1916 | Brooks |
| 3,533,389 A | | 10/1970 | Harker |
| 3,782,356 A | * | 1/1974 | Hamman ................. 123/185 C |
| 4,030,561 A | | 6/1977 | Hashimoto et al. |
| 4,083,263 A | | 4/1978 | Lundquist |
| 4,546,993 A | * | 10/1985 | Walker ....................... 280/291 |
| D282,154 S | * | 1/1986 | Cruze et al. ................ D12/114 |
| 4,802,684 A | * | 2/1989 | Bennette et al. ............ 280/291 |
| 4,934,210 A | | 6/1990 | Suzuki |
| 5,454,580 A | * | 10/1995 | Lin ............................. 280/191 |
| 5,482,307 A | * | 1/1996 | Lin ............................. 280/291 |
| 5,524,918 A | * | 6/1996 | Peabody et al. ............ 280/291 |
| 5,638,723 A | * | 6/1997 | Lin ............................... 74/564 |
| 6,161,859 A | * | 12/2000 | Cheng ...................... 74/564 X |

FOREIGN PATENT DOCUMENTS

| | | | | |
|---|---|---|---|---|
| JP | 2-188671 | * | 7/1990 | ................. 74/564 |
| JP | 10-167149 | * | 6/1998 | ................. 74/564 |

* cited by examiner

Primary Examiner—Vinh T. Luong
(74) Attorney, Agent, or Firm—Thomas R. Lampe

(57) ABSTRACT

A sleeve formed from individual cylinder segments is connected to the distal end of a motorcycle kick starter lever by mechanical fasteners to resist slippage of a motorcyclists foot on the lever. The cylinder segments are disposed on opposed sides of the lever and urge the cylinder segments toward one another and into clamping engagement with the distal end.

7 Claims, 2 Drawing Sheets

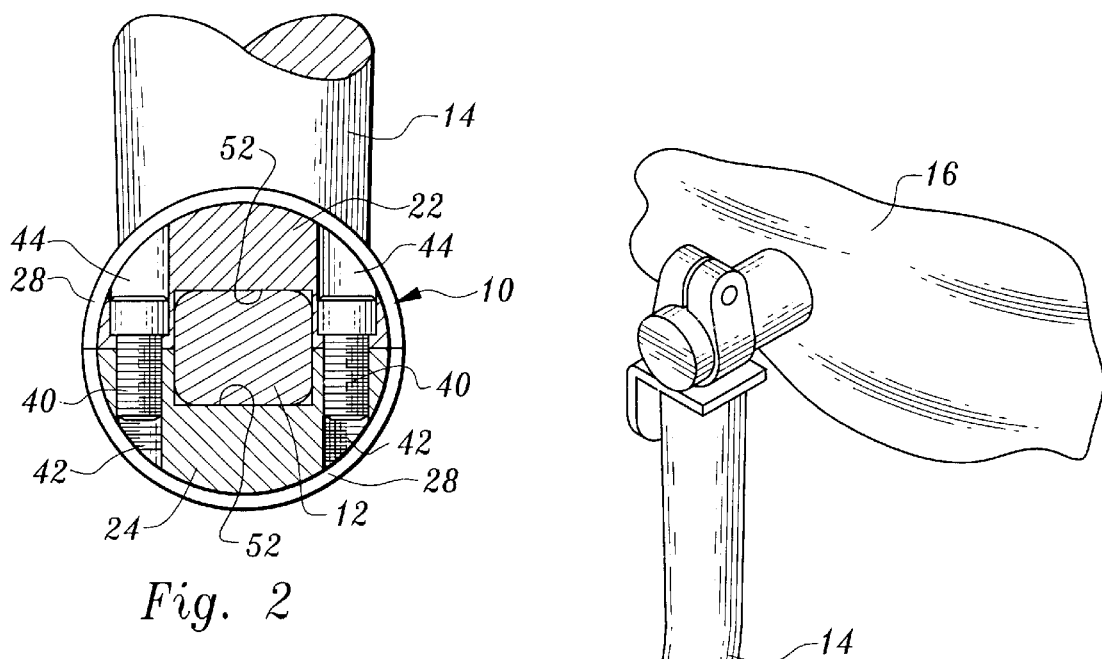
Fig. 2
Fig. 1
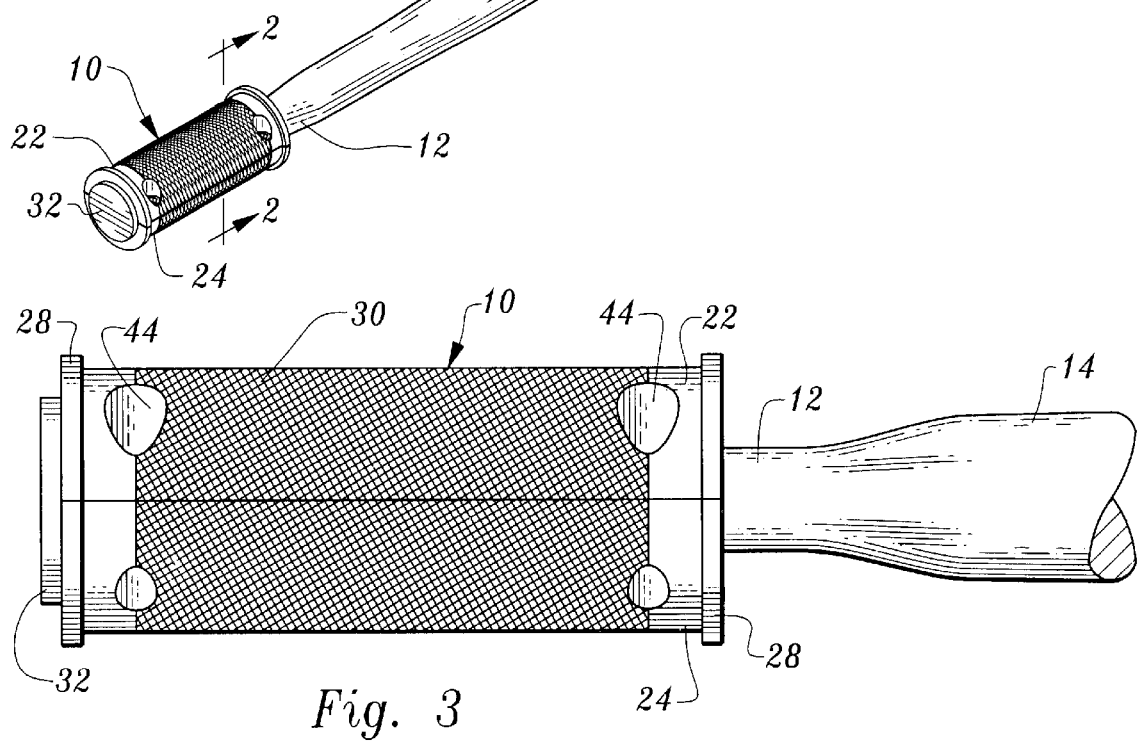
Fig. 3

ATTACHMENT FOR MOTORCYCLE KICK STARTER

TECHNICAL FIELD

This invention relates to apparatus for attachment to the distal end of a motorcycle kick starter lever for engagement by footwear of a cyclist when starting the engine of the motorcycle.

BACKGROUND OF THE INVENTION

Motorcycle kick starters are well known devices including kick starter levers to be engaged by the footwear of a cyclist when starting the engine.

Kick starters are, for example, shown in U.S. Pat. No. 4,030,561, issued Jun. 21, 1977, U.S. Pat. No. 3,533,389, issued Oct. 13, 1970 and U.S. Pat. No. 4,934,210, issued Jun. 19, 1990.

U.S. Pat. No. 4,083,263, issued Apr. 11, 1978, discloses an adjustable stirrup type motorcycle gear shifter allowing the cyclist to slip his shoe into shifting position, either sidewardly or lengthwise, for safe retention during up and down gear shifting. U.S. Pat. No. 1,207,490, issued Dec. 5, 1916, discloses attachments for an automobile crank starter system.

Conventional kick starter levers can present problems, especially in wet and/or muddy conditions. More particularly, the distal ends of conventional kick starter levers allow slippage between the cyclist's footwear and the lever. This results in a waste of time as well as aggravation to the cyclist. Such a problem becomes particularly acute during a motorcycle race. It is not uncommon for an engine to have to be restarted numerous times during a race. Of course, even for the non-racer, footwear slippage on a kick starter lever can be an irritant and in some cases even be dangerous.

The devices shown in the above-referenced prior art patents do not address these problems. U.S. Pat. No. 4,934,210 discloses a foot pedal at the end of a starter lever, however there is no teaching whatsoever as to the nature of the material used to form the foot pedal nor is there any teaching whatsoever that the foot pedal is releasably connected to the starter lever. As will be seen below, an important feature of the apparatus disclosed and claimed herein is its ability to be readily attached to or detached from the distal end of a kick starter lever. Once attached, the apparatus is fixedly secured in place on the lever, relative movement between the apparatus and the lever being prevented.

DISCLOSURE OF INVENTION

The present invention relates to apparatus for attachment to the distal end of a motorcycle kick starter lever for engagement by footwear of a cyclist when starting the engine of the motorcycle.

The apparatus includes a sleeve having an outer surface and formed of a rigid, non-resilient material, the sleeve for extending about the distal end of a motorcycle kick starter lever.

Mechanical fastener means is provided for releasably securing the sleeve to the distal end and for maintaining the sleeve at a fixed location on the motorcycle kick starter lever when the sleeve extends about the distal end.

The sleeve comprises a plurality of sleeve segments defining an opening for accommodating the distal end.

The mechanical fastener means comprises at least one threaded connector extending between the sleeve segments and urging the cylinder segments toward one another and into clamping engagement with the distal end when the sleeve is at a fixed location on the motorcycle kick starter.

Other features, advantages, and objects of the present invention will become apparent with reference to the following description and accompanying drawings.

BRIEF DESCRIPTION OF DRAWINGS

FIG. 1 is a perspective view illustrating apparatus constructed in accordance with the teachings of the present invention installed at the distal end of a motorcycle kick starter lever;

FIG. 2 is an enlarged, cross-sectional view taken along the line 2—2 in FIG. 1;

FIG. 3 is an enlarged, elevational side view of the apparatus and a portion of the kick starter lever distal end;

BEST MODE FOR CARRYING OUT THE INVENTION

Figure 4:
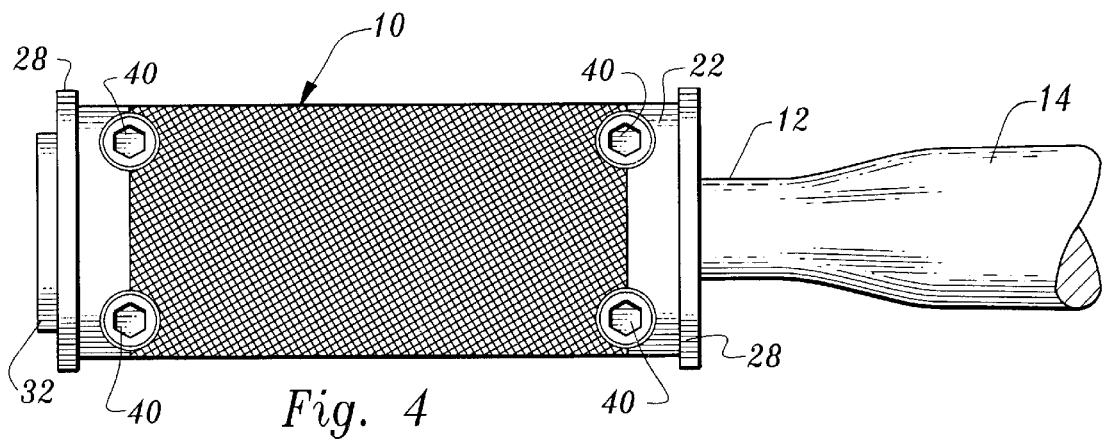
FIG. 4 is an enlarged, top view of the apparatus and a portion of the lever distal end.

Referring now to the drawings, the apparatus 10 of the present invention is for attachment to the distal end 12 of a kick starter lever 14 associated with a motorcycle 16, only a portion of the latter being shown (in FIG. 1).

Apparatus 10 is in the nature of a sleeve having an outer surface and formed of rigid, non-resilient material, preferably steel, aluminum, or other metal, for extending about the distal end 12. A hard plastic material could also be used. Mechanical fastener means is employed to releasably secure the sleeve to the distal end and maintain the sleeve at a fixed location on the motorcycle kick starter lever when the sleeve extends about the distal end.

More particularly, the sleeve comprises a pair of sleeve segments (which in the disclosed embodiment comprise half cylinders 22, 24) forming the sleeve. The sleeve includes a pair of opposed ends and flanges 28 project outwardly at the opposed ends. These flanges are for engagement with a cyclist's footwear (not shown) to resist movement of the footwear relative to the motorcycle kick starter lever. The cylindrical outer surface of the sleeve is roughened or knurled in the area designated by reference numeral 30 in FIG. 3 to further assist in resisting movement of the cyclist's footwear.

Figure 5:
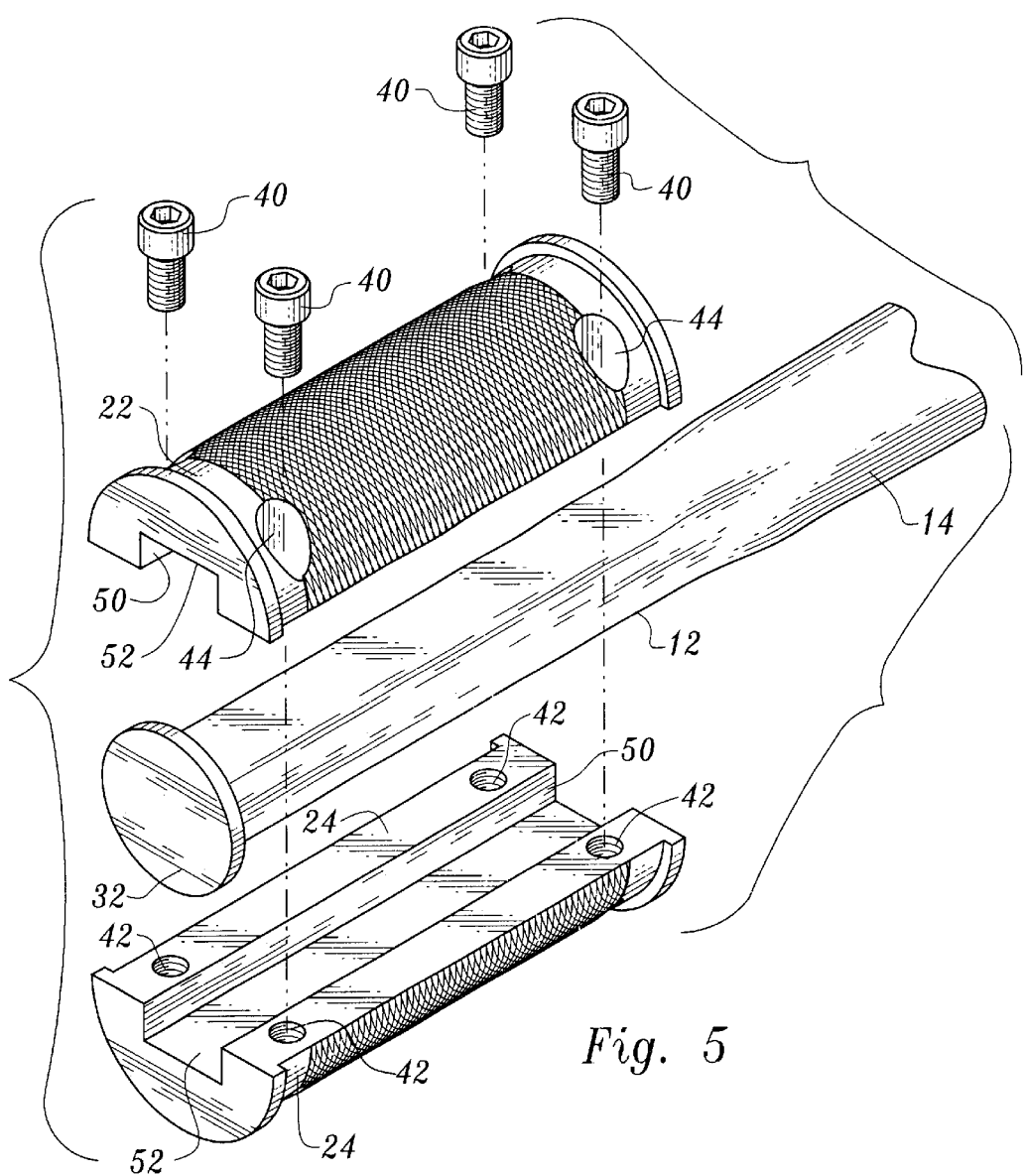
FIG. 5 is an enlarged, exploded, perspective view illustrating the components of the apparatus prior to attachment to the distal end of the kick starter lever.

The illustrated kick starter lever has enlargement 32 formed thereon. The distal end of the kick starter lever has a substantially rectangular configuration as perhaps best may be seen in FIGS. 2 and 5.

The mechanical fastener means for releasably securing the sleeve to the distal end and for maintaining the sleeve at a fixed location on the motorcycle kick starter lever comprises a plurality of screws 40. Half cylinder 24 defines screw threads 42 for threaded engagement by the screws 40. Half cylinder 22, on the other hand, defines recesses 44 for receiving the enlarged heads of the screws 40 whereby the screw heads are disposed below the outer surface of the sleeve.

Each half cylinder defines a notch 50 partially defined by an inner planar kick starter lever engagement surface 52.

These engagement surfaces 52 engage opposed planar sides of the kick starter lever distal end when the screws 40 are tightened and the cylinder segments are urged toward one another. In other words, the screws 40 maintain clamping engagement between the half cylinders and the kick starter lever distal end. The screws 40 are disposed on opposed sides of the distal end.

Such an arrangement provides a very secure and rigid interconnection between the apparatus and the distal end to maintain the apparatus at a fixed location on the kick starter lever. On the other hand, the apparatus may readily be removed from the kick starter lever distal end by loosening and removing the screws.

In the arrangement illustrated, the outermost sleeve end has an abutment surface for engaging the enlargement 32 of the distal end to assist in maintaining the device in proper position.

What is claimed is:

1. In combination:

a motorcycle kick starter lever having a distal end including two opposed, planar parallel sides and apparatus attached to the distal end of the motorcycle kick starter lever for engagement by footwear of a cyclist when starting the engine of the motorcycle, said apparatus comprising, in combination:

a sleeve having an outer surface and formed of rigid, non-resilient material extending about the distal end of the motorcycle kick starter lever; and mechanical fastener means releasably securing said sleeve to said distal end and maintaining said sleeve at a fixed location on the motorcycle kick starter lever, said sleeve including a pair of sleeve segments defining an opening accommodating said distal end, at least one of said sleeve segments having a notch forming said opening and each of said sleeve segments having a planar motorcycle kick starter lever engagement surface, said sleeve segments being disposed on opposed sides of the distal end, said mechanical fastener means comprising at least one threaded connector extending between said sleeve segments and urging said sleeve segments toward one another, toward said motorcycle kick starter lever and into clamping engagement with said distal end at said fixed location on the motorcycle kick starter lever, the planar motorcycle kick starter lever engagement surfaces engaging the two opposed, planar, parallel sides of said motorcycle kick starter lever to prevent relative movement between said sleeve and said distal end.

2. The apparatus according to claim 1 wherein said plurality of sleeve segments comprise a pair of half cylinders.

3. The apparatus according to claim 1 wherein said mechanical fastener means includes a plurality of screws, said screws being positioned at spaced locations on said sleeve, at least one of said sleeve segments defining screw threads threadedly engaged with said screws.

4. A The apparatus according to claim 3 wherein said screws include screw heads and wherein at least one of said sleeve segments defines recesses for receiving said screw heads whereby said screw heads are disposed below the outer surface of said sleeve.

5. The apparatus according to claim 1 wherein said sleeve includes a pair of opposed ends, said apparatus additionally comprising outwardly projecting flanges at said opposed ends for engagement with a cyclist's footwear to resist movement of the footwear relative to the motorcycle kick starter lever.

6. The apparatus according to claim 5 wherein said sleeve has an outer cylindrically shaped surface, at least some of said outer cylindrically shaped surface being non-smooth.

7. The apparatus according to claim 5 wherein an enlargement is formed on said kick starter lever distal end and one of said opposed ends includes an abutment surface engaging said enlargement.

* * * * *